United States Patent
Yu

(10) Patent No.: US 8,661,273 B2
(45) Date of Patent: Feb. 25, 2014

(54) AC DISCONNECT OF POWER OVER ETHERNET DEVICES

(71) Applicant: Broadcom Corporation, Irvine, CA (US)

(72) Inventor: James Yu, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/899,071

(22) Filed: May 21, 2013

(65) Prior Publication Data

US 2013/0254565 A1 Sep. 26, 2013

Related U.S. Application Data

(62) Division of application No. 12/552,858, filed on Sep. 2, 2009, now abandoned.

(51) Int. Cl.
*G06F 1/26* (2006.01)
*F02P 3/02* (2006.01)

(52) U.S. Cl.
USPC .......................................... 713/300; 323/371

(58) Field of Classification Search
None
See application file for complete search history.

(56) References Cited

U.S. PATENT DOCUMENTS

| | | | |
|---|---|---|---|
| 4,638,571 A | 1/1987 | Cook | |
| 6,662,793 B1 | 12/2003 | Allen et al. | |
| 7,356,588 B2 * | 4/2008 | Stineman et al. | 709/224 |
| 7,609,494 B2 | 10/2009 | Webb | |
| 7,723,929 B2 | 5/2010 | Orr | |
| 7,814,342 B2 * | 10/2010 | Hussain et al. | 713/300 |
| 8,014,412 B2 * | 9/2011 | Herbold | 370/419 |
| 2004/0164619 A1 * | 8/2004 | Parker et al. | 307/80 |
| 2006/0112288 A1 * | 5/2006 | Schindler | 713/300 |
| 2007/0170909 A1 * | 7/2007 | Vorenkamp et al. | 324/76.11 |
| 2009/0015237 A1 * | 1/2009 | Vetteth | 324/76.19 |
| 2010/0162025 A1 * | 6/2010 | Russo et al. | 713/340 |
| 2011/0055598 A1 | 3/2011 | Yu | |

* cited by examiner

*Primary Examiner* — Ji H Bae

(74) *Attorney, Agent, or Firm* — Sterne, Kessler, Goldstein & Fox P.L.L.C.

(57) ABSTRACT

Embodiments of power sourcing equipment (PSE) utilizing AC disconnect are provided herein. In one embodiment, a PSE is provided that includes a DC supply configured to provide a DC voltage over a data communications medium, a controller configured to provide an AC disconnect signal over the data communications medium, and a parallel inductor-capacitor (LC) circuit coupled between the DC supply and the data communications medium. The parallel LC circuit is configured to isolate the DC supply from the AC disconnect signal. In another embodiment, a PSE is provided that includes a DC supply configured to provide a DC voltage at an output, an inductor coupled between the output of the DC supply and a data communications medium, and a capacitor coupled between the data communications medium and ground. The inductor and capacitor form a series LC circuit configured to generate an AC disconnect signal.

20 Claims, 4 Drawing Sheets

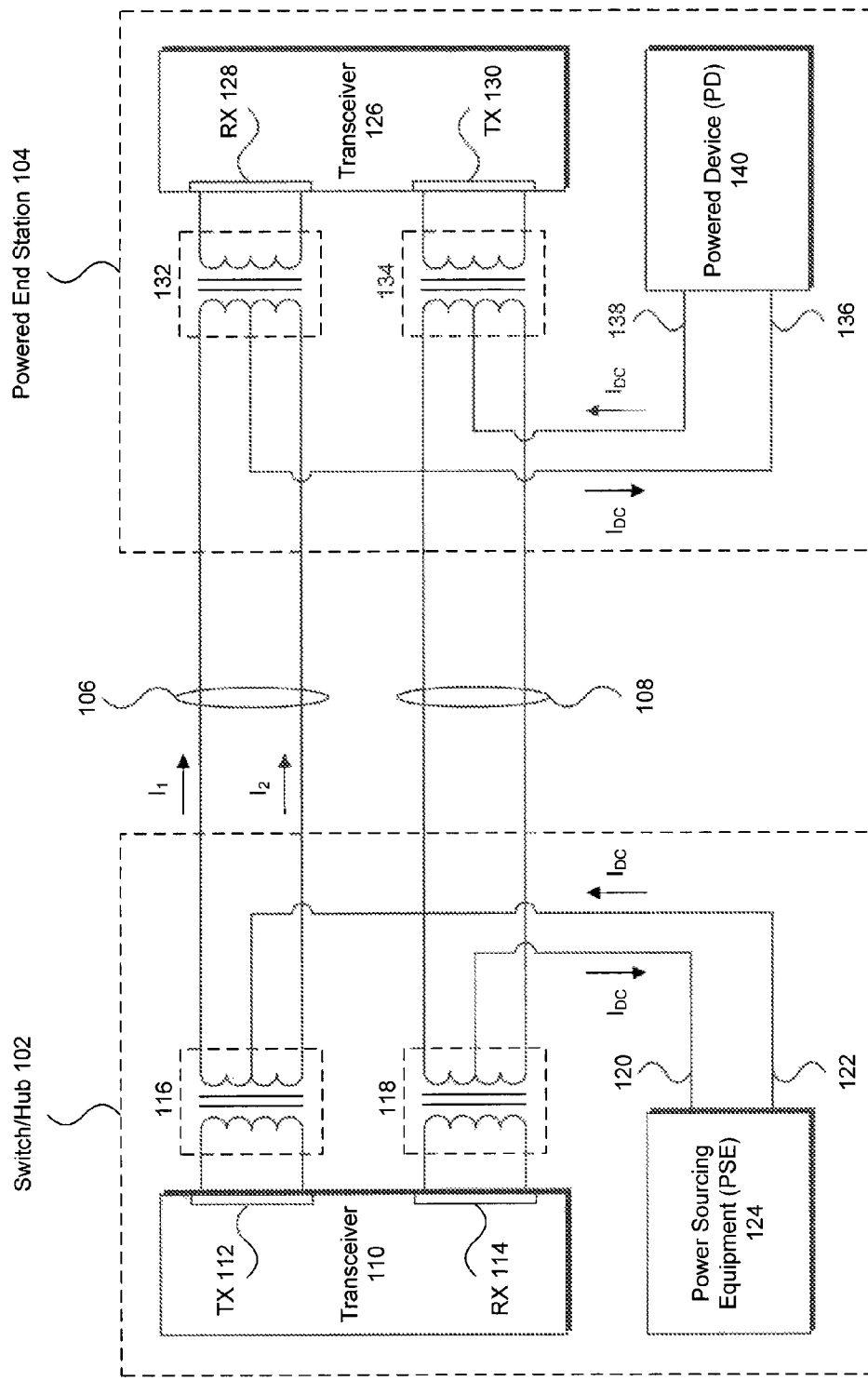
FIG. 1 (Power over Ethernet System)

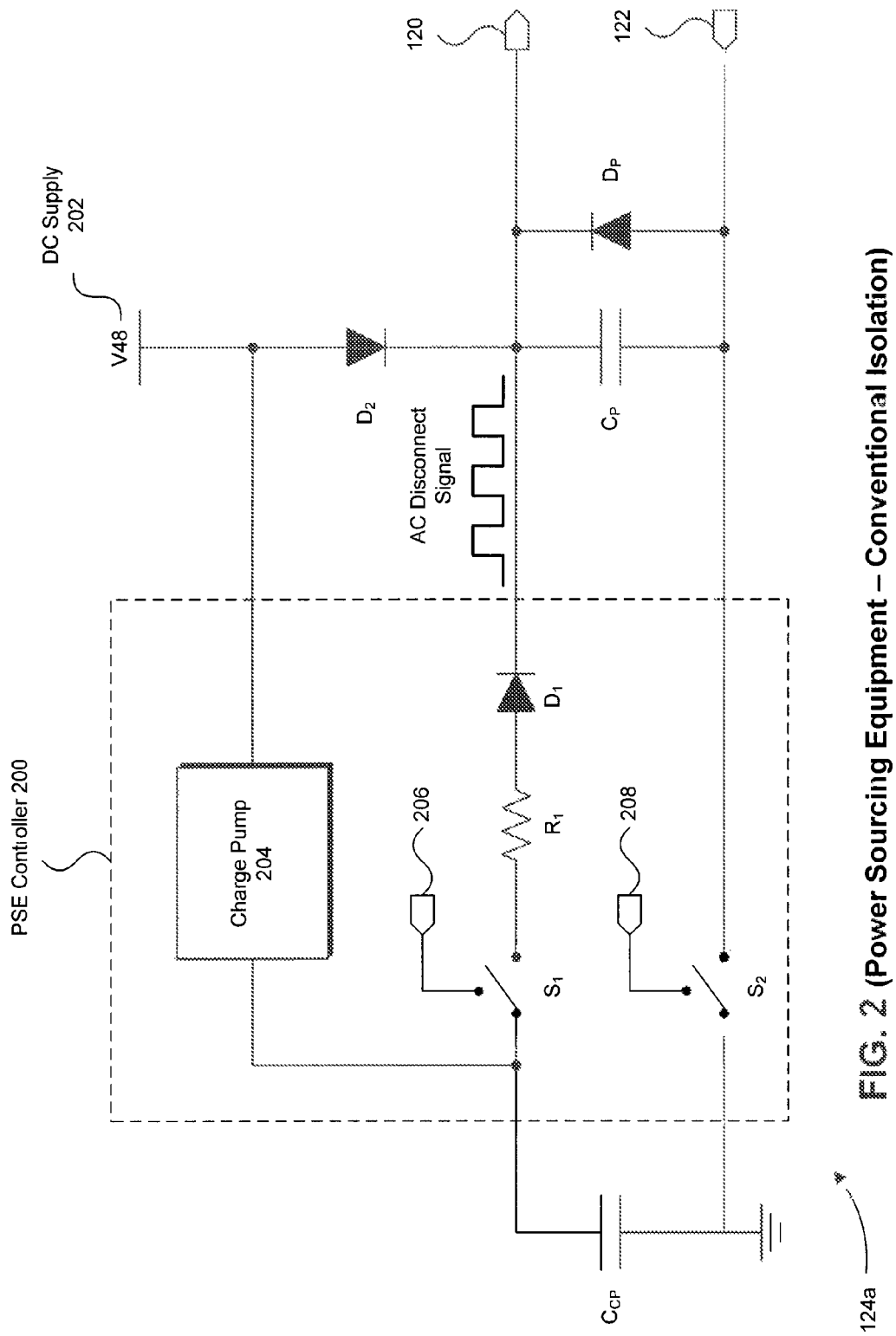
FIG. 2 (Power Sourcing Equipment – Conventional Isolation)

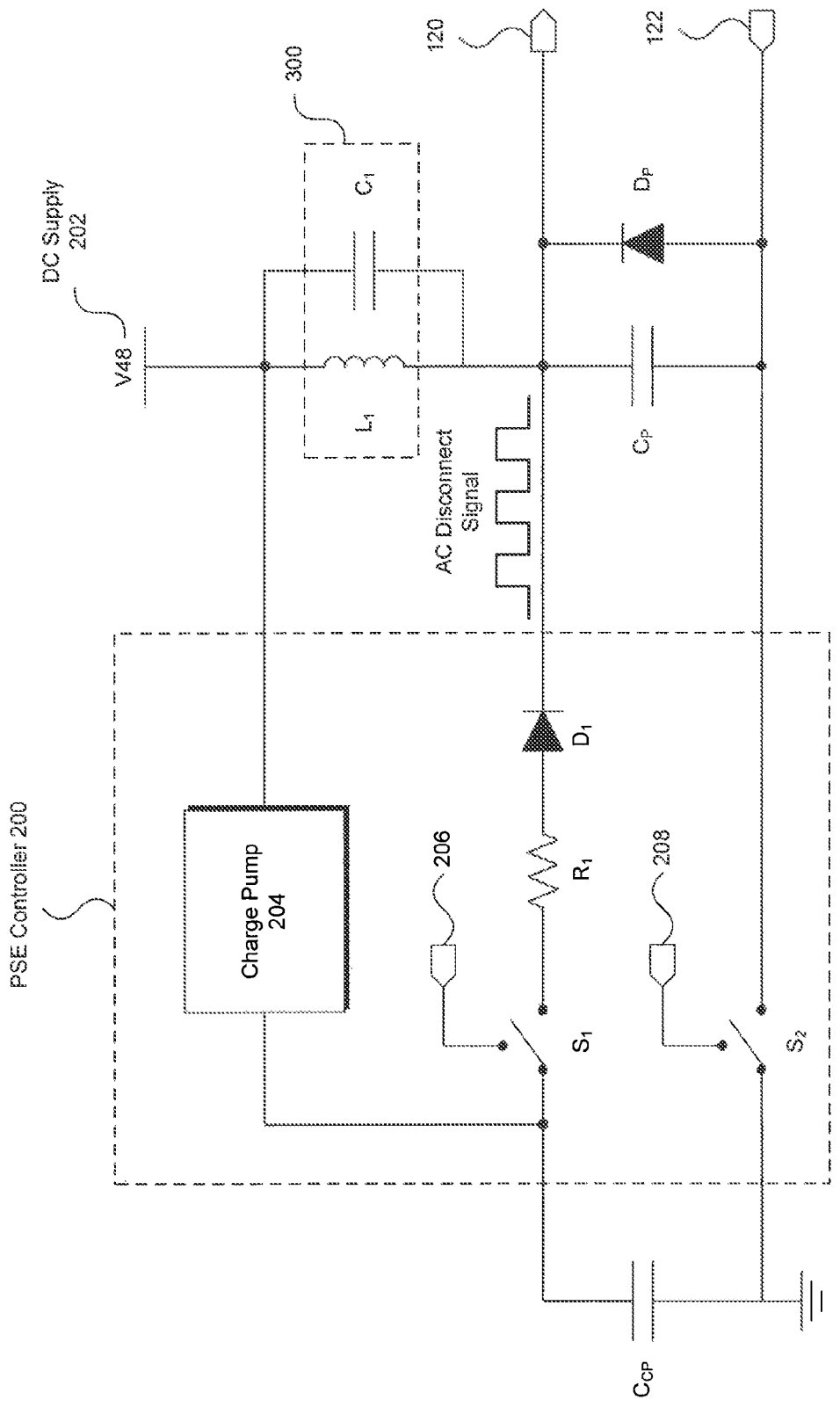
FIG. 3 (Power Sourcing Equipment – Parallel LC)

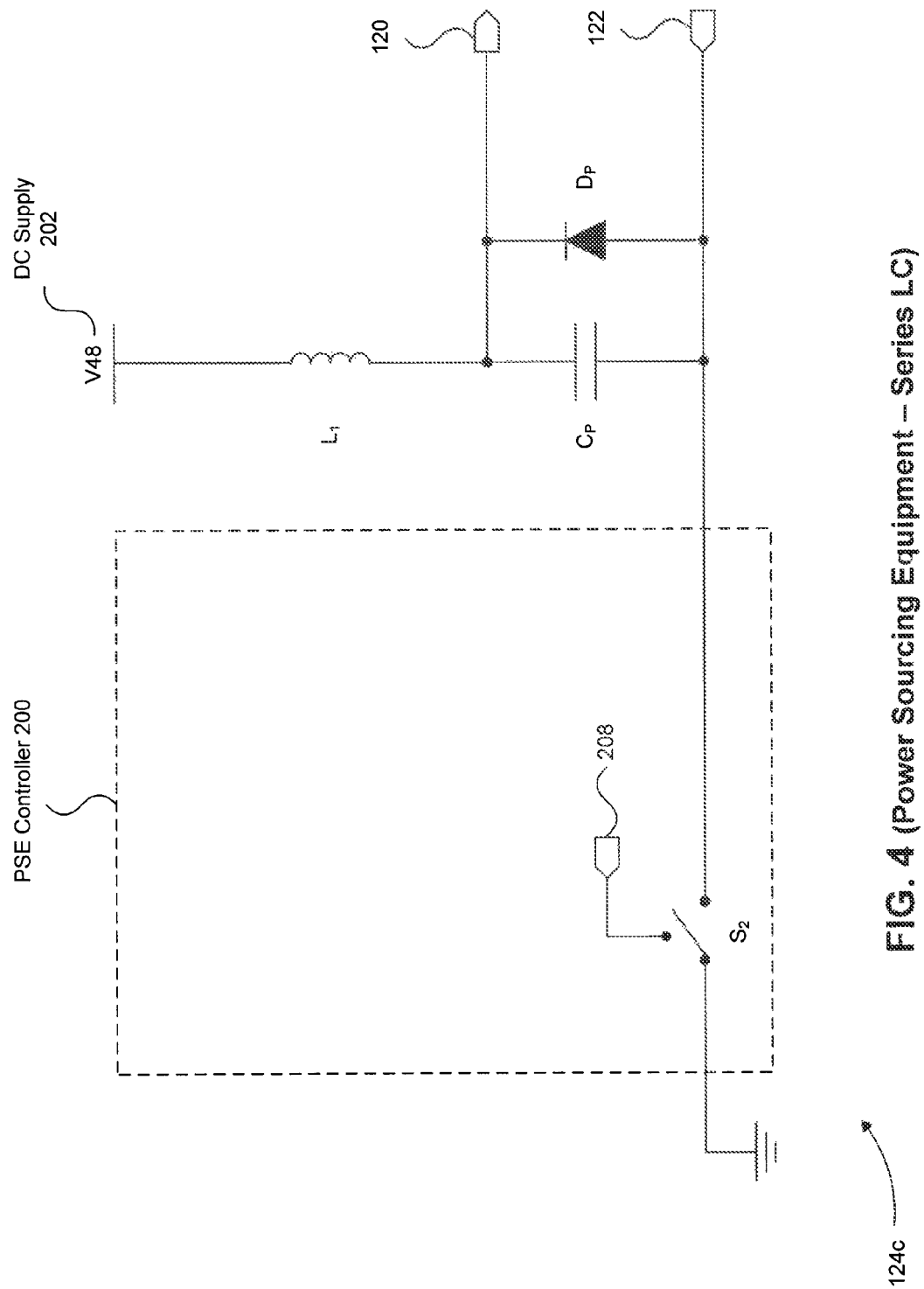
FIG. 4 (Power Sourcing Equipment — Series LC)

AC DISCONNECT OF POWER OVER ETHERNET DEVICES

CROSS REFERENCE TO RELATED APPLICATIONS

This application is a divisional of U.S. patent application Ser. No. 12/552,858, filed Sep. 2, 2009, and is incorporated herein by reference.

FIELD OF THE INVENTION

This application relates generally to Power over Ethernet (PoE) devices and, more specifically, to apparatuses for AC disconnect of PoE devices.

BACKGROUND

The IEEE 802.3af and 802.3 at specifications, also known as Power over Ethernet (PoE), provides a framework for delivering DC power concurrently with data over standard Ethernet cabling. A PoE system includes three basic components: power sourcing equipment (PSE) for providing power, a powered device (PD) for receiving and consuming the power, and cabling for transferring the power from the PSE to the PD. The PSE, as defined by the IEEE 802.3af/t specifications, performs much of the basic power provisioning process, including detection, classification, operation, and disconnection.

Detection is first performed by the PSE to determine if a valid PD is connected to its power providing output. Detection is carried out by inducing a small voltage at the output of the PSE to detect a specific 25 KΩ signature resistor. This signature indicates that a valid PD is connected and that the provision of power to the PD can begin.

After a valid PD is detected, an optional classification stage can be performed to estimate the amount of power required by the PD. To perform classification, the PSE again induces a voltage around 15.5-20.5 Vdc for a period of time within 10 to 75 ms. The current consumed by the PD during this time period indicates to the PSE its power classification.

Following detection and optional classification, the output power of the PSE can be increased, during the operation stage, to its full voltage capacity, which is typically around 48 Vdc. The output voltage of the PSE is gradually increased to its full voltage capacity to prevent high frequency noise from disrupting data being transferred concurrently with the power.

The final stage of the power provisioning process involves removal of power following the disconnection of the PD connected to the PSE. The IEEE 802.3af/t specifications define two specific techniques for power disconnection; namely, DC disconnect and AC disconnect. Both methods provide the same desired result—the detection of a disconnected PD and the removal of power within 300 to 400 ms thereafter. The removal of power when a PD is disconnected is important because the PD may be replaced by a non-PoE-ready device, which may result in damage.

DC disconnect is performed at the PSE by measuring the current consumed by the PD. If the PD is disconnected at any point, the consumption of current by the PD would cease, indicating disconnection of the PD. AC disconnect, on the other hand, entails the addition of a low AC signal on top of the 48 Vdc operating voltage. The returned AC signal amplitude is monitored at the PSE. While the PD is connected, the low impedance of the PD lowers the returned AC signal. During disconnection, however, the AC signal level will increase, indicating disconnection of the PD.

In conventional PSEs implementing AC disconnect, a diode is used to isolate the DC source, providing the 48 Vdc operating voltage, from the AC disconnect signal. Depending on the type of diode utilized, the diode can have a forward voltage drop of 0.3-0.7 Vdc at 600 in mA, or a total power consumption around 0.2-0.4 W, for example. Not only does the isolation diode increase overall power consumption, but further increases the overall temperature at the media dependent interface (MDI) of the PSE. This excess power consumption and temperature becomes even more apparent in multi-port hubs or switches that are PoE-ready. For example, in a 24-port hub that is PoE-ready, 24 separate diodes (one for each port) can be required to isolate the DC supply from the AC disconnect signal(s).

Therefore, what is needed is an apparatus for isolating a DC supply of a PSE from an AC disconnect signal, while limiting any additional power consumption and heat produced as a result thereof.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 illustrates an exemplary PoE system in which embodiments of the present invention can be implemented.

FIG. 2 illustrates portions of an exemplary PSE, utilizing conventional isolation technique.

FIG. 3 illustrates portions of an exemplary PSE, utilizing a parallel inductor-capacitor (LC) circuit, according to embodiments of the present invention.

FIG. 4 illustrates portions of an exemplary PSE, utilizing a series inductor-capacitor (LC) circuit, according to embodiments of the present invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. Operating Environment

FIG. 1 provides a diagram of an exemplary PoE system 100 in which embodiments of the present invention can be implemented. PoE system 100 includes a switch/hub 102 and a powered end station 104. Powered end station 104 can be any one of several different network nodes; for example, powered end station 104 can be an internet protocol (IP) phone or a wireless access point, to name a few. Switch/hub 102 provides power to powered end station 104 over conductor pairs 106 and 108, which are further configured to carry differential data between switch/hub 102 and powered end station 104.

As illustrated in FIG. 1, switch/hub 102 includes a transceiver 110 that achieves full duplex transmit and receive capability using a differential transmit port (TX) 112 and a differential receive port (RX) 114. A first transformer 116 couples high speed data between transmit port 112 and conductor pair 106. Likewise, a second transformer 118 couples high speed data between receive port 114 and conductor pair 108. The respective transformers 116 and 118 pass the high speed data to and from transceiver 110, but isolate any low frequency or DC voltage from the transceiver ports, which may be sensitive to large magnitude voltages.

Transformer 116 includes primary and secondary windings, where the secondary winding (coupled to conductor pair 106) includes a center tap 120. Transformer 118 includes primary and secondary windings, where the secondary winding (coupled to conductor pair 108) includes a center tap 122. Power Sourcing Equipment (PSE) 124 generates an output voltage that is applied across center taps 120 and 122 of transformers 116 and 118 on the conductor pair sides of the transformers. Center tap 120 is coupled to a first output of PSE 124, and center tap 122 is coupled to a second output of PSE 124. As such, transformers 116 and 118 isolate the DC voltage provided by PSE 124 from sensitive data ports 112 and 114 of transceiver 110. An example DC output voltage provided by PSE 124 is substantially 48 volts, but other voltages could be used depending on the voltage/power requirements of powered end station 104.

PSE 124 includes, a PSE controller (not shown) that controls the provisioning of DC power to powered end station 104. More specifically, the PSE controller of PSE 124 performs the basic power provisioning process defined by the IEEE 802.3af/t specifications, including detection, classification (optionally performed), operation, and disconnection. In an embodiment, the PSE controller of PSE 124 utilizes an AC disconnect technique to discontinue the supply of DC, power over conductor pairs 106 and 108 when powered end station 104 is disconnected.

Still referring to FIG. 1, the contents and functionality of powered end station 104 will now be discussed. Powered end station 104 includes a transceiver 126 having fall duplex transmit and receive capability that is achieved using differential receive port (RX) 128 and differential transmit port (TX) 130. A transformer 132 couples high speed data between conductor pair 106 and receive port 128. Likewise, a transformer 134 couples high speed data between transmit port 130 and conductor pair 108. Transformers 132 and 134 pass the high speed data to and from transceiver 126, but isolate any low frequency or DC voltage from sensitive data ports 128 and 130.

Transformer 132 includes primary and secondary windings, where the secondary winding (coupled to conductor pair 106) includes a center tap 136. Likewise, transformer 134 includes primary and secondary windings, where the secondary winding (coupled to conductor pair 108) includes a center tap 138. Center taps 136 and 138 supply the power carried over conductor pairs 106 and 108 to a powered device (PD) 140.

PD 140 can include a PD controller (not shown) to monitor the voltage and current provided to it. The PD controller can further provide the necessary impedance signatures on the return conductor 108 during detection, so that the PSE controller, implemented within PSE 124, can recognize PD 140 as a valid PoE-ready device.

During operation, a direct current ($I_{DC}$) flows from PSE 124 through center tap 120 and divides into a first current ($I_1$) and a second current ($I_2$) that are carried over conductor pair 106. The first current ($I_1$) and the second current ($I_2$) recombine at center tap 136 to reform the direct current ($I_{DC}$) used to power PD 140. On return, the direct current ($I_{DC}$) flows from PD 140 through center tap 138, and divides for transport over conductor pair 108. The return DC current recombines at center tap 122 and returns to PSE 124.

As discussed above, data transmission between switch/hub 102 and powered end station 104 can occur concurrently with the provisioning of DC power by PSE 124. Data is carried differentially over conductor pairs 106 and 108 between switch/hub 102 and powered end station 106. Because data is carried differentially over conductor pairs 106 and 108, the data is ideally unaffected by the DC power transfer, which appears as common mode.

It should be noted that other alternative configurations for PoE system 100 can be used without departing from the scope and spirit of the present invention. For example, in an alternative configuration of PoE system 100, DC power, supplied by PSE 124, is transmitted over the spare wire pairs of the Ethernet cabling as specified by the IEEE 802.3af/t Ethernet specifications.

2. Conventional Apparatus for Isolation

FIG. 2 illustrates portions of an exemplary PSE 124a, utilizing a conventional isolation technique. PSE 124a includes a PSE controller 200 and a DC supply 202. In an embodiment, DC supply 202 is configured to provide 48 Vdc across nodes 120 and 122, which are coupled to PD 140 as illustrated in FIG. 1. PSE controller 200 is configured to control PSE 124a to perform the basic power provisioning process defined by the BILE 802.3af/t specifications, including detection, classification (optionally performed), operation, and disconnection.

Detection is first performed by PSE controller 200 to determine it a valid PD is coupled to output nodes 120 and 122. Detection is specifically carried out by producing a small voltage across nodes 120 and 122 to detect a specific signature resistor, such as 25 KΩ. This signature indicates that a valid PD, such as PD 140 illustrated in FIG. 1, is coupled to PSE 124a and that the provision of power to the PD can begin.

After a valid PD is detected, an optional classification stage can be performed to estimate the amount of power required by the PD. To perform classification, PSE controller 200 again produces a voltage (e.g., around 15.5-20.5 Vdc) for a predetermined period of time (e.g., 10 to 75 ms). The current consumed by the PD during this predetermined period of time indicates to PSE controller 200 the power classification of the PD.

Following detection and optional classification, the output power of PSE 124a can be increased, during the operation stage, to its full voltage capacity, which is typically around 48

Vdc. The output voltage of the PSE is gradually increased to its full voltage capacity to prevent high frequency noise from disrupting data being transferred concurrently with the power.

It should be noted that portions of the entire structure for performing detection, classification, and operation (i.e., the first three stages of the basic power provisioning process defined by the IEEE 802.3af/t specifications) have been omitted from the illustration in FIG. 2 for the sake of clarity.

The final stage of the power provisioning process involves removal of power following the disconnection of the PD inductively coupled to PSE 124a at nodes 120 and 122. The IEEE 802.3af/t specifications define two specific techniques for power disconnection; namely, DC disconnect and AC disconnect. Both methods provide the same desired result— the detection of a disconnected PD and the removal of power within 300 to 400 ms thereafter. The removal of power when a PD is disconnected is important because the PD may be replaced by a non-PoE-ready device, which may result in damage of the device.

PSE 124a is configured to perform AC disconnect, which entails the addition of a low AC signal on top of the 48 Vdc operating voltage provided by DC supply 202. To generate the low AC signal, PSE controller 200 includes a charge pump 204 that is coupled at an input to the 48 Vdc signal produced by DC supply 202. Charge pump 204 is configured to generate a voltage signal that is higher than the 48 Vdc signal received at its input. In embodiment, the voltage signal produced by charge pump 204 is substantially 3 V higher than the 48 Vdc signal; that is, charge pump 204 produces a 51 Vdc signal that is applied across charge pump capacitor $C_{CP}$. Capacitor $C_{CP}$ can be utilized at the output of charge pump 204 to smooth variations in the 51 Vdc signal produced.

Switch S1, further included in PSE controller 200 and coupled to the 51 Vdc signal, can be switched on and off to produce the AC disconnect signal, which transitions back and forth from 48 V to 51 V at the frequency in which switch S1 is switched on and off. In an embodiment, switch S1 is controlled by a control signal 206 provided by an oscillator (not shown). In a further embodiment, switch S1 is switched on and off at a frequency of 27 Hz. The resulting AC disconnect signal (of frequency 27 Hz) is coupled to node 120 through resistor $R_1$ and diode $D_1$, where diode $D_1$ provides reverse isolation.

After generation and provisioning of the AC disconnect signal, the returned AC signal amplitude is monitored at PSE 124a. While the PD is connected, the low AC impedance of the PD lowers the returned AC signal. During disconnection, however, the AC impedance across terminals 120 and 122 increases significantly and, as a result, the AC signal level will increase, indicating disconnection of the PD. Switch $S_2$ is controlled by control signal 208 to discontinue the provision of DC power when disconnection is detected. Specifically, to discontinue the provision of DC, power, switch $S_2$ is opened. It should be noted that the structure used to monitor the returned AC signal has been omitted from FIG. 2 for the sake of clarity.

PSE 124A further implements a conventional technique to isolate the generated AC disconnect signal from the DC supply 202. Specifically, PSE 124A utilizes a diode $D_2$ to isolate DC supply 202, which provides the 48 Vdc operating voltage across nodes 120 and 122, from the AC disconnect signal. Depending on the type of diode utilized, the diode can have a forward voltage drop of 0.3-0.7 Vdc at 600 mA, or a total power consumption around 0.2-0.4 W, for example. Not only does diode $D_2$ increase overall power consumption, but further increases the overall temperature at the media dependent interface (MDI) of PSE 124a. This excess power consumption and temperature becomes even more apparent and prohibitive in multi-port hubs or switches that are PoE-ready. For example, in a 24-port hub that is PoE-ready, 24 separate diodes (one for each port) can be required to isolate the DC supply from the AC disconnect signal.

Therefore, what is needed is an apparatus for isolating DC supply 202 from the AC disconnect signal, while limiting additional power consumption and, heat produced as a result thereof.

It, should be noted that protection capacitor $C_P$ and protection diode $D_P$, further illustrated in FIG. 2, can be used to neutralize surge events on and across nodes 120 and 122. In an embodiment, diode DP is a transient voltage suppression (TVS) diode used to limit the differential voltage across nodes 120 and 122.

3. Parallel Inductor-Capacitor (LC) Circuit

FIG. 3 illustrates portions of an exemplary PSE 124b, according to embodiments of the present invention. The implementation of PSE 124b eliminates the need for diode $D_2$ illustrated in FIG. 2 and used to isolate DC supply 202 from the generated AC disconnect signal. Diode $D_2$ has been replaced by a parallel combination of an inductor $L_1$ and a capacitor $C_1$ in the implementation of PSE 124b illustrated in FIG. 3.

The parallel inductor-capacitor (LC) circuit 300, formed from inductor $L_1$ and capacitor $C_1$, has a resonant frequency given by:

$$f = \frac{1}{2\pi\sqrt{L_1 C_1}}$$

At resonance, the effective impedance of parallel LC circuit 300 is extremely large; in fact, the theoretical impedance is infinite. Thus, the value of $L_1$ (specified in Henries) and the value of $C_1$ (specified in Farads) can be selected such that their parallel combination has a resonant frequency equal to the fundamental frequency of the AC disconnect signal generated by PSE controller 200. For example, assuming that the AC disconnect signal generated by PSE controller 200 has a fundamental frequency of 4 kHz, a value of 680 μH for inductor $L_1$ and 2.2 μF for capacitor $C_1$ establishes a resonant frequency of approximately 4 kHz for the parallel LC combination. Therefore, this specific implementation of the LC combination, formed by inductor $L_1$ and capacitor $C_1$, will present an extremely large impedance to the 4 kHz AC disconnect signal and effectively isolate DC supply 202 from the 4 kHz AC disconnect signal.

Moreover, the power consumed by inductor $L_1$ and capacitor $C_1$ is considerably less than diode $D_2$, illustrated in FIG. 2. Inductor L1 and capacitor C1 will generally only dissipate power as a result of their parasitic resistances, which are typically fairly low valued, especially compared to the effective resistance of a forward biased diode.

It should be noted that parallel LC circuit 300 can include additional active and passive components and is no way limited to the structure illustrated in FIG. 3. For example, parallel LC circuit 300 can further include a resistor or additional inductive and capacitive components.

4. Series Inductor-Capacitor (LC) Circuit

FIG. 4 illustrates portions of an exemplary PSE 124c, according to embodiments of the present invention. The implementation of PSE 124c eliminates the need for charge pump 204, capacitor $C_{CP}$, switch $S_1$, resistor $R_1$, and diode $D_1$, all of which were used, at least in part, to generate the AC disconnect signal as illustrated in FIG. 2. In addition, diode D2, used in FIG. 2 to isolate DC supply 202 from the generated AC disconnect signal, has been eliminated and replaced by an inductor $L_1$.

Inductor $L_1$ and capacitor $C_P$ form a series inductor-capacitor (LC) circuit that produces an oscillation (i.e., an AC disconnect signal) when a PD, coupled to nodes 120 and 122, is disconnected. The occurrence of this oscillation can be monitored for by PSE controller 200 to detect the disconnection of the PD and to discontinue the provisioning of DC power. Specifically, during operation, DC supply 202 is configured to provide 48 Vdc (for example) to the PD inductively coupled to nodes 120 and 122. Current flows through inductor $L_1$ during operation and out node 120. When the PD is disconnected, inductor $L_1$ resists changing the current flowing through it and continues to supply current, which now charges capacitor $C_P$. Eventually, the energy stored in the magnetic field of inductor $L_1$ is exhausted and the current supplied by inductor $L_1$ ceases. However, the charge now stored on capacitor $C_P$ will begin to flow back through inductor L1, re-establishing its magnetic field. When all the charge stored on capacitor $C_P$ has been dissipated, energy will again be extracted from the magnetic field of the inductor to continue the flow of current.

This flow of charge, back and forth between capacitor $C_1$ and inductor $L_1$, following disconnection, produces an oscillation that can be detected by PSE controller 200 to signal disconnection. Once detected switch $S_2$ can be opened by control signal 208 to stop the provisioning of DC power. The series LC circuit is often referred to as a tank circuit, which has similar properties to water sloshing back and forth in a tank.

It should be noted that the frequency of oscillation, produced by the series LC circuit, is specified by its resonant frequency, given by:

$$f = \frac{1}{2\pi\sqrt{L_1 C_P}}$$

For example, assuming a value of 4.7 µH for inductor $L_1$ and a value of 0.01 µF for capacitor $C_P$, the frequency of oscillation produced by the series LC circuit will be approximately 700 kHz. This 700 kHz oscillation provides an effective AC disconnect signal that can be monitored for and detected by PSE controller 200 to stop the provisioning of DC power.

It should be further noted that an additional capacitor, other than protection capacitor $C_P$ can be utilized to form the series LC circuit illustrated in FIG. 4. In addition, diode $D_P$ can be configured to prevent possible over voltages from occurring across nodes 120 and 122 as a result of the oscillations produced by the series LC circuit illustrated in FIG. 4.

5. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. Power sourcing equipment (PSE) for providing DC power to a powered device (PD) over a data communications medium, the PSE comprising:
    an inductor coupled between an output of a DC supply, from which the DC power is provided, and the data communications medium; and
    a capacitor coupled between the data communications medium and ground,
    wherein the inductor and capacitor form a series inductor-capacitor (LC) circuit configured to generate an AC disconnect signal.

2. The PSE of claim 1, wherein the series LC circuit is configured to generate the AC disconnect signal in response to the PD being disconnected from the data communications medium.

3. The PSE of claim 2, further comprising:
    a PSE controller configured to detect the AC disconnect signal and stop the DC power from being provided over the data communications medium.

4. The PSE of claim 1, wherein data is transmitted concurrently with the DC power over the data communications medium.

5. The PSE of claim 4, wherein the data is transmitted in accordance with an Ethernet standard.

6. The PSE of claim 1, wherein the series LC circuit forms a tank circuit.

7. The PSE of claim 1, wherein the AC disconnect signal has a frequency substantially equal to the resonant frequency of the series LC circuit.

8. The PSE of claim 1, wherein the capacitor is configured to reduce surge events on the data communications medium.

9. The PSE of claim 1, wherein the PSE is implemented within a hub or a switch.

10. Power sourcing equipment (PSE) for providing DC power to a powered device (PD) over spare wires of a data communications medium, the PSE comprising:
    an inductor coupled between an output of a DC supply, from which the DC power is provided, and the spare wires of the data communications medium; and a capacitor coupled between the spare wires of the data communications medium and ground,
wherein the inductor and capacitor form a series inductor-capacitor (LC) circuit configured to generate an AC disconnect signal.

11. The PSE of claim 10, wherein the series LC circuit is configured to generate the AC disconnect signal in response to the PD being disconnected from the data communications medium.

12. The PSE of claim 11, further comprising:
a PSE controller configured to detect the AC disconnect signal and stop the DC power from being provided over the spare wires of the data communications medium.

13. The PSE of claim 10, wherein the series LC circuit forms a tank circuit.

14. The PSE of claim 10, wherein the AC disconnect signal has a frequency substantially equal to the resonant frequency of the series LC circuit.

15. The PSE of claim 10, wherein the capacitor is configured to reduce surge events on the spare wires of the data communications medium.

16. The PSE of claim 10, wherein the PSE is implemented within a hub or a switch.

17. Power sourcing equipment (PSE) for providing DC power to a powered device (PD) over a data communications medium, the PSE comprising:
an inductor coupled between an output of a DC supply, from which the DC power is provided, and the data communications medium;
a capacitor coupled between the data communications medium and ground; and
a PSE controller configured to detect an AC disconnect signal, generated by the inductor and the capacitor in response to the PD being disconnected from the data communications medium, and stop the DC power from being provided over the data communications medium.

18. The PSE of claim 17, wherein data is transmitted concurrently with the DC power over the data communications medium.

19. The PSE of claim 18, wherein the data is transmitted in accordance with an Ethernet standard.

20. The PSE of claim 17, wherein the PSE is implemented within a hub or a switch.

* * * * *